United States Patent [19]

Given et al.

[11] Patent Number: 5,180,149

[45] Date of Patent: Jan. 19, 1993

[54] BRAKE CYLINDER PISTON SPRING

[75] Inventors: Michael S. Given; Joe W. Wright, both of Xenia, Ohio

[73] Assignee: Twist Inc., Xenia, Ohio

[21] Appl. No.: 802,556

[22] Filed: Dec. 5, 1991

[51] Int. Cl.⁵ .............................. F16F 1/06; F16F 1/08
[52] U.S. Cl. ..................................... 267/180; 267/176
[58] Field of Search .............................. 267/166–180; 92/75

[56] References Cited

U.S. PATENT DOCUMENTS

| 2,616,684 | 11/1952 | Richter | 267/180 |
| 3,292,884 | 5/1965 | Scheldorf | 267/180 |
| 3,336,842 | 8/1967 | Adelt | 267/180 |
| 3,589,226 | 5/1971 | Shadowens | 267/180 |
| 4,017,062 | 4/1977 | Zwirner | 267/166 |
| 4,077,619 | 3/1978 | Borlinghaus | 267/180 |
| 4,111,407 | 9/1978 | Stager | 267/166 |
| 4,463,843 | 8/1984 | Taig | 192/111 |
| 4,993,376 | 2/1991 | Fukutome et al. | 267/166 |

Primary Examiner—Robert J. Oberleitner
Assistant Examiner—Chris Schwartz
Attorney, Agent, or Firm—Biebel & French

[57] ABSTRACT

A coil spring is provided for use in biasing opposing piston portions of a brake cylinder away from each other. The spring includes a body portion formed of a length of alloy wire and including adjacent coils spaced from each other defining a cylindrical helix. A pair of end portions are formed integrally with the body portion and include a plurality of coils positioned in contact with each other and defining a conical helix shape for engaging the opposing piston portions of the brake cylinder.

4 Claims, 1 Drawing Sheet

BRAKE CYLINDER PISTON SPRING

BACKGROUND OF THE INVENTION

The present invention relates to coil springs and, more particularly, to coil springs for use within a brake cylinder.

Automobile braking systems incorporating drum brakes typically include a master cylinder and a slave cylinder wherein the master cylinder is used to actuate the slave cylinder located within a brake drum assembly. The slave cylinder includes a pair of opposing pistons located adjacent to opposing ends of the cylinder and a seal is located behind each of the pistons to prevent fluid from leaking out of the cylinder through the clearance area between the pistons and the cylinder walls. The outer end of each of the pistons is adapted to engage an end of a brake shoe such that actuation of the pistons results in the brake shoes being biased outwardly into firm engagement with the brake drum.

In order to ensure that the seals behind the pistons remain separated from each other and remain positively engaged with the pistons and the inner wall of the cylinder, the slave cylinder is also provided with a spring located between the opposing pistons and engaged within a frustoconical-shaped recess on the seals. The spring is formed having the shape of a cylindrical helix and, in order to provide a proper bearing surface for engaging the recesses in the seals, a pair of frustoconical-shaped sheet metal rings or caps are attached to the ends of the spring by means of staking. This spring is relatively expensive to produce since it requires separate operations for forming the spring and the metal rings, as well as for attaching the rings to the ends of the spring. Further, this constructions is subject to failure if the rings separate from the spring at the staking points, which failure could result in the internal bore of the cylinder becoming scraped as the rings move around relative to the spring and thus requiring reworking or replacement of the slave cylinder.

Accordingly, there is a need for a spring for use within a brake cylinder which is economical to produce and which is not subject to failure as a result of the end portions separating from the spring.

SUMMARY OF THE INVENTION

The present invention provides a coil spring for biasing opposing piston portions of a brake cylinder away from each other. The spring includes a body portion which is in the form of a cylindrical helix and which defines a longitudinal axis of the spring. The helix of the body portion is formed by a plurality of spring coils wherein adjacent coils are spaced from each other for permitting compression of the body portion of the spring.

The spring is further provided with fist and second end portions formed at opposing ends of the body portion. Each of the end portions is formed by a plurality of coils positioned in contact with each other and defining a helix shape of decreasing diameter, such as a conical helix. A plurality of the coils forming each of the end portions each include a radial outer edge which is located radially outwardly from a radial inner edge of an adjacent coil having a greater mean diameter such that axial compression of the end portions is prevented.

In addition, each of the end portions includes a final coil which is distal from the body portion and each final coil has an outer diameter less than the inner diameter of an adjacent coil. The final coil lies substantially coplanar with a respective adjacent coil such that each end portion defines a substantially planar contact area formed by the final coil and its adjacent coil, which contact area is adapted to contact a respective planar surface on the piston portions.

Other objects and advantages of the invention will be apparent from the following description, the accompanying drawings, and the appended claims.

DETAILED DESCRIPTION OF THE PREFERRED EMBODIMENT

Figure 1:
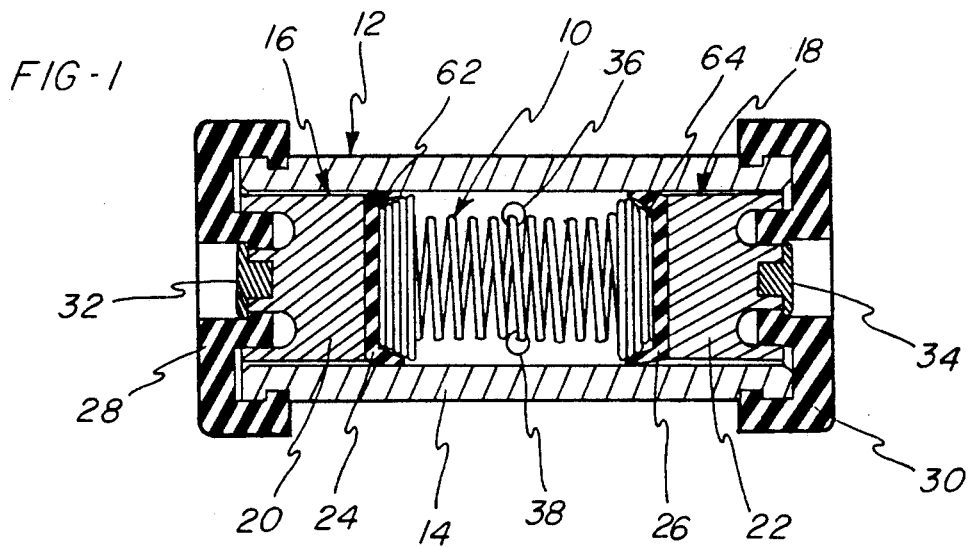
FIG. 1 is a cross-sectional view through the center of a typical brake slave cylinder.

Referring to FIG. 1, the spring 10 of the present invention is designed for use within a drum brake slave cylinder 12 including a cylinder body 14 for guiding a pair of piston portions 16, 18 in axial movement relative to the cylinder body 14.

The piston portions 16, 18 each include a piston 20, 22 and a fluid seal 24, 26 formed of a resilient elastomer material. In addition, each of the piston portions 16, 18 is provided with a respective outer seal 28, 30 for forming a fluid seal between the interior of the body 14 and the outwardly facing ends 32, 34 of the pistons 20, 22.

The ends 32, 34 of the pistons 20, 22 are each adapted to engage one end of a brake shoe in response to pressurized fluid being introduced into the body 14 through an inlet port 36, resulting in an outward biasing force being applied against the pistons 20, 22. The body 14 is also provided with an outlet port 38 for permitting fluid to be released from the cylinder 12.

Figure 2:
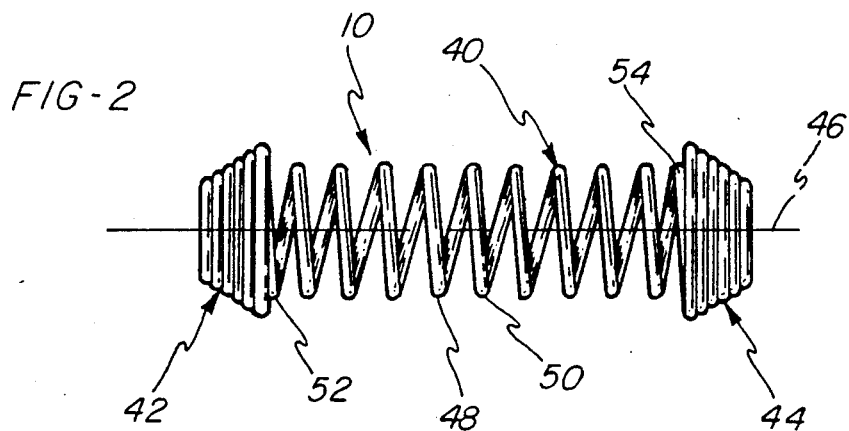
FIG. 2 is an elevational view of the spring of the present invention.

Referring to FIG. 2, the spring 10 is formed from a single length of a spring quality metal alloy wire, such as piano wire, wire having a substantially circular cross-section and includes a body portion 40 and opposing end portions 42, 44 formed integrally with the body portion 40. The body portion 40 is formed in the shape of a cylindrical helix defining a longitudinal axis 46 of the spring 10. The cylindrical helix is formed of a plurality of coils wherein adjacent coils are spaced from each other. It should be noted that for the present application, a coil is defined as a single turn of the wire forming the spring, such as the section of the body portion 40 extending from point 48 to point 50. The number of coils provided on the body portion 40 will be dictated by the dimensions of the brake cylinder 12 and the number of coils is selected such that in the fully compressed state, the coils of the body portion 40 will not be stacked in contact with each other.

Figure 3:
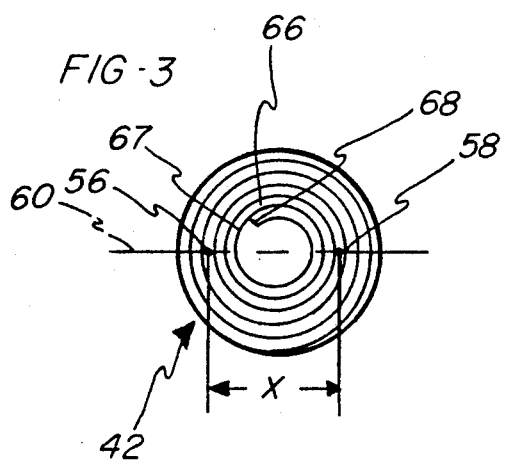
FIG. 3 is an end view of the spring of the present invention.
Figure 4:
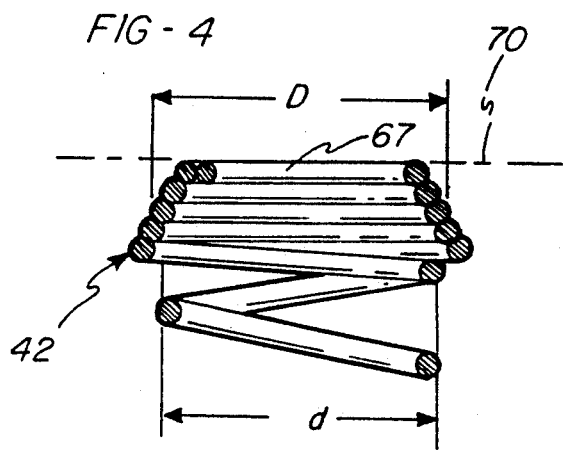
FIG. 4 is a cross-sectional view taken through an end portion of the spring of the present invention.

Referring to FIGS. 2-4, the details of the end portions 42, 44 will be described. As may be seen, the end portions 42, 44 are formed integrally from the length of spring wire which forms the body portion 40 and each end portion 42, 44 is preferably in the shape of a helix having a decreasing diameter in a direction away from the body portion 40, such as is defined by a conical helix. It should be noted that the spring includes transition areas 52, 54 where the diameter of the coils increases to a diameter greater than the diameter defined by the coils of the body portion 40 as the spring transitions from the body portion 40 to the end portions 42, 44.

The particular configuration of the end portions 42, 44 will be described with reference to end portion 42 and it should be noted that end portion 44 is substantially identical to end portion 42. As may be seen in FIGS. 2 and 4, the end portion 42 is formed of a plurality of coils wherein adjacent coils are in contact with each other. Further, the coils forming the end portion 42 have a decreasing mean diameter in a direction away from the body portion 40. The term "mean diameter" in the present application refers to a distance measured from a point 56 located at a center portion of the coil wire to a diametrically opposed point 58 at the center of the coil wire, as illustrated by way of example by distance X in FIG. 3. Further, comparisons of the diameters of adjacent coils is made with reference to diameters measured along a common diametric line 60 extending along a line perpendicular to and passing through the longitudinal axis 46.

A seen in FIG. 4, a plurality of coils forming the end portion 42 each include a radial outer edge defining a diameter D which is located radially outwardly from a radial inner edge defining a second diameter d of an adjacent coil wherein the adjacent coil has a greater mean diameter than the coil defining the diameter d. By this construction, adjacent coils engage each other to prevent axial compression of the end portion 42 while also providing an inwardly tapering surface in a direction away from the body portion 40.

As may be seen in FIG. 1, each of the seals 24, 26 is formed with a frustoconical-shaped recess 62, 64 and the frustoconical-shaped ends 42, 44 are particularly adapted to engage within the recesses 62, 64 whereby the sealing edges of the seals 24, 26 are continually biased outwardly by the spring 10.

Referring again to FIGS. 3 and 4, it should be noted that the final coil 64, as defined from point 66 to point 68 on the end portion 42, has an outer diameter which is less than the inner diameter of the immediately adjacent coil. Thus, the final coil 67 lies substantially coplanar with the respective adjacent coil such that each nd portion defines a substantially planar contact area, as defined by the plane line 70 in FIG. 4. The planar areas of the end portions 42, 44 are adapted to contact respective planar surfaces formed within the seals 24, 26 of the piston portions 16, 18.

Further, as is apparent from the drawings, the coils of the end portions 42, 44 adjacent the body portion 40 define a greater diameter than the coils of the body portion 40. Thus, the end portions 42, 44 are adapted to maintain the body portion 46 in a central location out of contact with the inner walls o the cylinder body 14 and thereby avoid abrasive wear of the body portion 40 during operation of the spring 10.

It should be noted that although the end portions 42, 44 have been described as having a profile which is substantially frustonconical, the shape of the end portions 42, 44 may e varied while maintaining an inwardly angled contact surface for engaging the recesses 62, 64. For example, the end portions 42, 44 may be formed having a substantially dome-shaped profile. Alternatively, the end portions 42, 44 may be formed having two or more angles defining the inwardly directed sides of these portions.

In addition, it should be noted that the body portion may be formed having several of the coils at the center of the body portion 40 formed in contact with each other while the coils between the center portion and the end potions are formed in spaced relationship to each other. The only restriction on forming the body portion 40 in this manner is that the spaced coils provide sufficient compressive movement to meet the requirements of the spring within the brake cylinder.

While the forms of apparatus wherein described constitute preferred embodiments of the invention, it is to be understood that the invention is not limited to these precise forms of apparatus, and that changes may be made therein without departing from the scope of the invention, which is defined in the appended claims.

What is claimed is:

1. A coil spring or use in a brake cylinder having a cylindrical inner wall and opposing piston elements having frustonconical recesses, said spring comprising:
    a body portion formed f a length of wire in the shape of a helix defining a longitudinal axis of said spring and including a plurality of coils wherein adjacent coils are spaced from each other;
    opposing first and second end portions formed of said length of wire at opposing ends of said body portion, each said end portion including a plurality of coils wherein adjacent coils are in contact with each other to limit compressive movement of said coils forming said end portions relative to each other;
    said coils forming said end portions each defining a conical helix shape decreasing in diameter in a direction away from said body portion for engaging within frustoconical recesses in the opposing brake cylinder piston elements; and
    wherein said coils forming said end portions define a maximum spring diameter at each end of said spring greater than a diameter defined by said body portion such that said end portions prevent contact between said body portion and the cylindrical inner wall of the brake cylinder containing said spring along the length of said body portion.

2. The spring of claim 1, wherein a plurality of said coils forming said end portions include a radial outer edge which is located radially outwardly from a radial inner edge of a an adjacent coil having a greater mean diameter whereby axial compression of said end portions is prevented.

3. The spring of claim 1, wherein said body portion is a cylindrical helix.

4. A coil spring for use in biasing opposing piston portions of a brake cylinder away from each other, said spring comprising:
    a body portion formed of a length of alloy wire in the shape of a cylindrical helix defining a longitudinal axis of said said spring and including a plurality of coils wherein adjacent coils are spaced from each other;
    opposing first and second end portions formed of said length of alloy wire, each o said end portions having a substantially conical helix shape and including a plurality of coils wherein adjacent coils are in contact with each other and said end portion coils adjacent to said body portion define a greater diameter than daily body portion coils to prevent contact between said body portion and an inner wall of a brake cylinder containing said coil spring;

said coils of each of said first and second end portions having decreasing mean diameter in a direction from said body portion for engaging within tapered frustoconical recesses in opposing piston portions within a brake cylinder and wherein a plurality of said coils in each of said fist and second end portions each include a radial outer edge which is located radially outwardly from a radial inner edge of an adjacent coil having a greater mean diameter whereby axial compression of said end portions is prevented; and wherein each end portion includes a final coil distal from said body portion, each said final coil having an outer diameter less than the inner diameter of an adjacent coil and each said final coil lies substantially coplanar with a respective adjacent coil such that each end portion defines a substantially planar contact area for contacting respective planar surfaces on said piston portions.

* * * * *

UNITED STATES PATENT AND TRADEMARK OFFICE
CERTIFICATE OF CORRECTION

PATENT NO.  : 5,180,149
DATED       : January 19, 1993
INVENTOR(S) : Michael S. Given et al It is certified that error appears in the above-identified patent and that said Letters Patent is hereby corrected as shown below:

Column 4, line 20, "f" should be --of--;

line 47, "a", first occurrence, should be deleted;

line 61, "o" should be --of--; line 66, "daily" should be --said--.

Column 5, line 7, "fist" should be --first--.

Signed and Sealed this

Twenty-sixth Day of October, 1993

Attest:

BRUCE LEHMAN

*Attesting Officer*     Commissioner of Patents and Trademarks